(12) United States Patent
Kocher et al.

(10) Patent No.: US 6,298,442 B1
(45) Date of Patent: Oct. 2, 2001

(54) SECURE MODULAR EXPONENTIATION WITH LEAK MINIMIZATION FOR SMARTCARDS AND OTHER CRYPTOSYSTEMS

(75) Inventors: Paul C. Kocher; Joshua M. Jaffe, both of San Francisco, CA (US)

(73) Assignee: Cryptography Research, Inc., San Francisco, CA (US)

( * ) Notice: Subject to any disclaimer, the term of this patent is extended or adjusted under 35 U.S.C. 154(b) by 0 days.

(21) Appl. No.: 09/325,528

(22) Filed: Jun. 3, 1999

Related U.S. Application Data

(60) Provisional application No. 60/087,829, filed on Jun. 3, 1998.

(51) Int. Cl.[7] .............................. G06F 12/14; H04L 9/28; H04L 9/30
(52) U.S. Cl. ......................... 713/194; 713/193; 380/28; 380/30
(58) Field of Search .................................. 713/190, 193, 713/194, 180; 380/28, 30, 264, 265; 711/163, 164; 257/922; 708/135, 212, 490, 503, 620, 625, 606

(56) References Cited

U.S. PATENT DOCUMENTS

| | | | |
|---|---|---|---|
| 4,200,770 | 4/1980 | Hellman et al. ........................ | 178/22 |
| 4,405,829 | 9/1983 | Rivest et al. ......................... | 178/22.1 |
| 4,759,063 | 7/1988 | Chaum ................................... | 380/30 |
| 4,908,038 | 3/1990 | Matsumura et al. ...................... | 902/5 |
| 5,159,632 | * 10/1992 | Crandall ................................. | 380/28 |
| 5,401,950 | 3/1995 | Yoshida ................................. | 235/487 |
| 5,664,017 | * 9/1997 | Gressel et al. ......................... | 380/30 |
| 5,892,829 | * 4/1999 | Aiello et al. ......................... | 380/25 |
| 5,982,900 | * 11/1999 | Ebihara et al. ........................ | 380/30 |
| 6,064,740 | * 5/2000 | Curiger et al. ....................... | 380/265 |

OTHER PUBLICATIONS

Kocher, P. "Timing Attacks on Implementations of Diffie–Hellman, RSA, DSS and Other Systems." in: Koblitz, N., *Advances in Cryptology—CRYPTO '96* (Berlin, Springer, 1996), pp. 104–113.

(List continued on next page.)

*Primary Examiner*—Gail Hayes
*Assistant Examiner*—Justin T. Darrow
(74) *Attorney, Agent, or Firm*—Joseph Yang; Thomas R. Lane; Skadden, Arps, et al.

(57) ABSTRACT

Methods and apparatuses are disclosed for securing cryptosystems against external monitoring attacks by reducing the amount (and signal to noise ratio) of useful information leaked during processing. In general, this is accomplished by implementing critical operations using "branchless" or fixed execution path routines whereby the execution path does not vary in any manner that can reveal new information about the secret key during subsequent operations. More particularly, various embodiments of the invention include: implementing modular exponentiation without key-dependent conditional jumps; implementing modular exponentiation with fixed memory access patterns; implementing modular multiplication without using leak-prone multiplication-by-one operations; and implementing leak-minimizing multiplication (and other operations) for elliptic curve cryptosystems.

44 Claims, 1 Drawing Sheet

OTHER PUBLICATIONS

Figure 1:
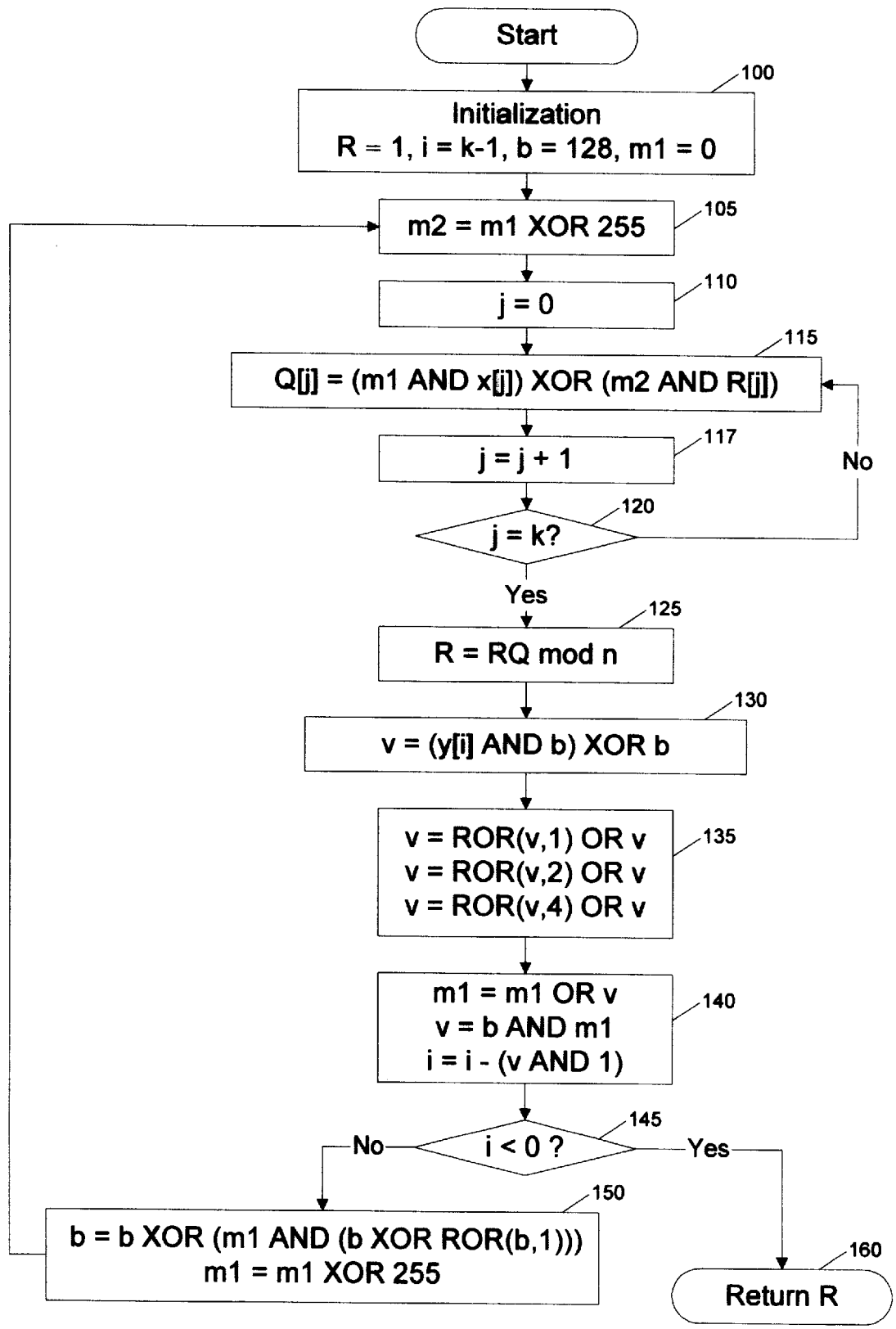

Bellare, M. et al., "Incremental Cyrptography: The Case of Hashing and Signing" in: Desmedt, Y., *Advances in Cryptology—CRYPTO '94*.

"Security Requirements for Cryptographic Modules," Federal Information Processing Standards Publication (FIPS PUB) 140–1, U.S. Department of Commerce, National Institute of Standards and Technology, Jan. 1994.

RSA Data Security, RSAREF Cryptographic Toolkit Source Code, File R–Random.C, available fronftp://ftp.rsa.com.

Krawczyk, H. et al., "HMAC: Keyed–Hashing for Message Authentication," Network Working Group Request for Comments RFC 2104, Feb. 1997.

Ryan, J. "Blinds for Thermodynamic Cipher Attacks," unpublished material on the world wide web at http://www.cybertrace.com/thrmatak.html Mar. 1996.

Menezes, A.J., et al., *Handbook of Applied Cryptography* (CRC Press, 1996), pp. including 285–298, 312–319, 452–462, 475, 515–524.

"Data Encryption Standard," Federal Information Processing Standards Publication (FIPS PUB) 46–2, U.S. Department of Commerce, National Institute of Standards and Technology, Dec. 30, 1993.

Lacy, J. et al., "CryptoLib version 1.1," File bigpow.c from CryptoLib., 11/91.

"File NN.C from RSAREF," RSA Laboratories, a division of RSA Data Security, Inc., 1991.

\* cited by examiner

SECURE MODULAR EXPONENTIATION WITH LEAK MINIMIZATION FOR SMARTCARDS AND OTHER CRYPTOSYSTEMS

This application claims the benefit of U.S. provisional patent application No. 60/087,829, filed on Jun. 3, 1998.

This application is related to co-pending U.S. patent application Ser. No. 09/224,682, filed on Dec. 31, 1998.

FIELD OF THE INVENTION

The method and apparatus of the invention relate generally to securing cryptographic systems against external attacks and, more specifically, to minimizing the information discoverable by external monitoring of a processor performing, cryptographic operations involving modular exponentiation.

BACKGROUND OF THE INVENTION

Most cryptosystems implementations include a combination of hardware and software. For example, cryptographic smartcards on the market today typically include a hardware microprocessor that executes programs stored in internal secure memory (which can be read-only or updateable). This or other memory is used to hold cryptographic keys, which are managed by these programs. Such keys are used in connection with various cryptographic operations including, without limitation, symmetric encryption using DES, triple DES, IDEA, SEAL, and RC4; public key (asymmetric) encryption and decryption using, RSA and ElGamal; digital signatures using, DSA, ElGamal, and RSA; and Diffic-Heilman key agreement protocols. The key-based operations are, in turn, used to securely process messages being handled by the cryptosystems.

For example, in asymmetric (i.e., public-key based) systems, private keys are used to perform digital signatures and decrypt received data. For example, in the RSA protocol, a private key includes a secret exponent, and a received message is cryptographically signed (or a received encrypted message is decrypted) by raising the message to the value of the secret exponent. These and many other details and aspects of private key operations are well known to those skilled in the art (see, e.g., such standard references as *Handbook of Applied Cryptography* by Menezes et al., CRC Press, 1997 and/or *Applied Cryptography* by Schneier, Wiley, 1996) and need not be described in detail here. Attackers who obtain the private key can use it to forge digital signatures, modify transmitted data, and intercept transmitted information. Therefore, the private key must be kept secret. Symmetric (e.g., DES) systems similarly contain cryptographic keys that must be kept secret. Therefore, well-designed cryptographic systems should prevent attackers who eavesdrop on communications from compromising key security. As a matter of convenience, the key to be protected—whether asymmetric or symmetric—will be referred to herein as a secret quantity.

In addition, many cryptographic systems require tamper-evident or tamper-resistant hardware, and other implementation-specific measures, to prevent attackers from accessing or finding the secret keys. Physical measures might include enclosing key management systems in physically durable enclosures, physical shielding (e.g., shielding according to U.S. Government Tempest specifications), physical isolation, wrapping devices with fine wires or membranes that detect tampering, and coating integrated circuits with special coatings that destroy the chip when removed. Such techniques are often expensive or physically cumbersome, and therefore inappropriate for many applications. They are also difficult to design/evaluate because, for example, there is no mathematical model for their security.

The foregoing techniques are also ineffective against certain types of attacks. For example, recent work by Cryptography Research, Inc. has shown that attackers can often non-invasively extract secret keys using external measurement and analysis of a device's power consumption, electromagnetic radiation, or processor cycle timing during performance of cryptographic operations. Known physical and electronic techniques used to deter external monitoring of cryptographic secrets include: a) equipping power supplies with large capacitors to mask fluctuations in power consumption; b) enclosing devices in well-shielded cases to prevent electromagnetic radiation; c) buffering inputs/outputs to prevent signals from leaking out on I/O lines; d) message blinding to prevent timing attacks; and e) using timing delays to equalize operation times. These known techniques can be helpful in deterring some types of external monitoring attacks, but are impractical and/or ineffective against other attacks. For example, timing equalization may deter timing attacks, but not power consumption attacks. Also, well shielded power supplies can deter power consumption attacks, but they cannot be used in small devices.

Furthermore, it is extremely difficult to make hardware key management systems that provide good security, particularly in low-cost, unshielded cryptographic devices for use in applications where attackers may gain physical control over the device. For example, cryptographic smartcards used in electronic cash and content distribution schemes must protect their keys in potentially hostile environments. Smartcards are examples of cryptographic tokens—devices that contain or manipulate cryptographic keys that need to be protected from attackers. Forms in which tokens may be manufactured include, without limitation, smartcards, specialized encryption and key management devices, secure telephones, secure picture phones, consumer electronics devices using cryptography, secure microprocessors, and other tamper-resistant cryptographic systems.

In such cryptographic tokens, many of the aforementioned techniques are ineffective or impractical. For example, physical measures that deter tampering by increasing the likelihood of detection (e.g., by authorized users or security personnel) are ineffective for cryptographic tokens when attackers gain physical control over the token (e.g., smartcards used in stored value schemes, satellite television descrambling schemes, etc.), because only the attacker would witness the evidence of tampering. Many physical measures (e.g., wire-wrapping) are impractical because their cost is prohibitive where cryptographic tokens must be produced at relatively low cost. Also, physical measures are often impractical for mobile (e.g., personal) cryptographic tokens due to reliance on external power sources, the physical impracticality of shielding, and other characteristics imposed by a token's physical (e.g., size or weight) constraints. Furthermore, it is often difficult to select/implement appropriate countermeasures at the design stage, before it is known what information will be available to an attacker—as is often the case before a device has been physically manufactured and characterized.

There is therefore a need for cryptographic security techniques that can be: a) characterized at the design level before a device is physically built; b) implemented where traditional physical techniques fail or need to be augmented (e.g., against power consumption and timing attacks); and/or c) implemented within the physical constraints of smartcards and other cryptographic tokens.

SUMMARY OF THE INVENTION

Many cryptographic operations involve asymmetric cryptographic protocols (e.g., RSA or Diffie-Hellman) that use of modular exponentiation including a private key having a secret exponent and a modulus. Thus, an attacker who determines the secret exponent generally breaks the scheme.

Modular exponentiation with a large exponent is conventionally performed as a series of squaring (multiplication by self) and multiplication (by other than self) operations. Which of these operations occurs at any particular time is controlled by a conditional jump (or branch) that depends on the value of the exponent (i.e., key) as it is traversed, commonly bit-by-bit. However, microcontrollers (or other forms of microprocessors) used in smartcards and other cryptographic devices can exhibit significant differences in power consumption, electromagnetic radiation, and/or timing between when a conditional jump in the execution path is taken and when it is not taken, thus making results of branching decisions often among the easiest information for attackers to identify. Such differences arise because the microcontroller execution sequence varies depending on the branch. For example, attackers can determine secret exponents (and therefore, private keys) by distinguishing cases where two squaring operations occur in sequence (typically corresponding to exponent bits equal to zero) from cases where a multiplication operation separates the two squaring operations (typically corresponding to exponent bits equal to one). Therefore, in order to provide a secure implementation of RSA or other exponentiation-based cryptosystems, techniques are needed to reduce the amount of useful information leaked to attackers. Unless noted otherwise, it shall be assumed herein that reducing (or masking or minimizing) leakage refers generally to reducing the leakage of any information that is potentially useful to an attacker trying determine secret information. Thus, the leaked information includes the secret information itself, but also other information pertaining to that secret information. Of course, the attacked device may also leak information (including information correlated to its internal processing operations) that is not useful to attackers, but such information is not of concern to the present invention.

One technique of the invention reduces leakage from cryptosystems by implementing critical operations using "branchless" or fixed execution path routines whereby the execution path does not vary in any manner that can reveal new information about the secret key during subsequent operations. In one embodiment, this is achieved by implementing modular exponentiation without key-dependent conditional jumps.

Another technique of the invention implements modular exponentiation with fixed memory access patterns, so that (for example) information leaked from the memory bus will not be correlated to the secret key in ways that compromise the key.

Another technique of the invention implements modular multiplication within modular exponentiation processes without using leak-prone multiplication-by-one operations.

Still other techniques of the invention implement leak-minimizing multiplication (and other operations) for elliptic curve cryptosystems. The foregoing and other techniques of the invention are described in detail below.

Finally, the techniques of the invention can be used in place of, or in conjunction with, other techniques (e.g., physical shielding or reforming the cryptographic protocols to incorporate leak resistance) to achieve secure implementation where, for physical constraints and other reasons, no technique by itself is completely effective.

Although the aforementioned techniques have been developed in response to the particular challenges of protecting portable, poorly-shielded, low-cost devices such as smartcards, such techniques are also applicable to virtually any cryptographic device that is subject to external monitoring attacks.

DETAILED DESCRIPTION OF THE INVENTION

Introduction

Those skilled in the art will recognize that the following pseudocode describes one commonly used conventional procedure for computing $R = x^y \mod n$, where "^" denotes exponentiation (e.g., $2^5=32$). As will be inherently understood to those skilled in the art, the base x is the message (or, more generically, some quantity derived therefrom or representation thereof), y is the exponent (of k bits in length), and n is the (prime or composite) modulus:

$R \leftarrow 1$.
For i=k-1 downto 0:
    $R \leftarrow R^2 \mod n$.
    If (y_i=1) then
        $R \leftarrow Rx \mod n$.
EndFor.
Return (R).

Here, $y_{13}$ i denotes bit i of y such that y_0 is the least significant bit and y_(k-1) is the most significant bit. In standard exponent encoding conventions, a "0" bit specifies a squaring (i.e., multiplication of accumulator R by itself) while a "1" bit specifies squaring followed by a multiplication (of accumulator R by base x). Modular multiplication and squaring operations are particularly vulnerable to external monitoring attacks because they involve a relatively high number of state transitions, resulting in significant fluctuations in power consumption. Detectable differences in the leaked information can include timing, operation duration, structure or shape of leaked signals, etc. In the above procedure, security is compromised if an attacker can determine whether (or not) the device actually performed the modular multiplication step "$R \leftarrow Rx \mod n$" because this determines whether the i-th bit of the exponent y is one (or zero). By monitoring the occurrence (or nonoccurrence) of such modular multiplication as exponentiation occurs on a bit-by-bit basis, the exponent can therefore be determined.

Those skilled in the art will also recognize that another common technique for computing $x^y \mod n$ uses a table containing precomputed powers of x. For example, when exponent bits are considered pairwise or two-at-a-time (in a sense, equivalent to operating in base 4 rather than in base 2), the table would be of size 4 and would contain look-up values for $x^0$, $x^1$, $x^2$, and $x^3$. In this case, the accumulator steps updating R in the modular exponentiation loop would perform two squaring (mod n) operations, followed by a multiplication (mod n) with one of the table values: $x^0$ for a "00" bit pair (or "0" in base 4); $x^1$ for a "01" bit pair (or "1" in base 4); $x^2$ for a "10" bit pair (or "2" in base 4); and $x^3$ for a "11" bit pair (or "3" in base 4). Of course, in the case where the current two bits of exponent y are 00, two equivalent possibilities arise: either no operation ("no-op") is performed (involving a processing branch, whose path is commonly easy to detect using external monitoring attacks); or the $x^0$ table element is used. Since $x^0$ equals 1, the operation becomes a multiplication by 1. However, multiplication by 1 neither changes the result nor requires any processing in the modular reduction part of the modular multiplication, and is also easily detectable. This case is therefore characterized by: a) significantly reduced complexity during multiplication; and/or b) the absence of modular reduction. Thus, it is relatively easy for an attacker to detect this case (i.e., it can be distinguished from other modular multiplications). By identifying the pairs of zero exponent bits, the attacker obtains (statistically) one-fourth of the exponent bits. Also, the attacker knows that the remaining (as-yet unknown) exponent bit pairs are nonzero. As a result, the total unknown information in the exponent is reduced by almost 40 percent. For exponents of length N, the number of possible exponents is reduced from $4^{(N/2)}$ to $3^{(3/4*N)}$. For example, this effectively converts a 128-bit (i.e., N=128) exponent to about a 76-bit exponent, giving a $(2^{52})$-fold (over 4000 trillion-fold) reduction in the number of possible exponents. This information can be used by an attacker to reduce the computational effort required to determine the remaining bits of the secret exponent. Other fluctuations, including those due to timing and power consumption in memory accesses, can provide the rest of the exponent to an attacker.

The foregoing illustrates just two common examples of how previously-known modular exponentiators perform multiplication and other operations in ways that can leak, or facilitate determination of, secret exponents as they are being operated on.

Exemplary implementations of leak-minimizing modular exponentiators using techniques of the invention will now be described. As will be seen in greater detail below, these techniques include: a) implementing path-independent (i.e., branchless) modular exponentiation (which can include avoiding all key-dependence in the execution path); b) making the pattern of accessed values on the memory bus independent of the exponent bit values; and c) avoiding the performance-reducing and often externally-detectable multiplication-by-one.

Refer now to FIG. 1, which illustrates one exemplary implementation for computing R=x^y mod n, where R, x, y, and n are large numbers of size k bytes. (For example, for 1024-bit RSA without the Chinese Remainder Theorem, k would be 128.) This process is performed by a general purpose microprocessor, by a dedicated cryptoprocessor, or by some other underlying processor, in accordance with software and/or hardwired instructions directing the acts specified in the following steps. At step 100, the apparatus initializes its internal registers for the operation as follows: the result register R is loaded with 1, the exponent byte register i is set to the offset of the last exponent byte (k−1), the 8-bit exponent bit counter b is set to 128 (a mask for the most significant bit in a byte), and the first data mask m1 is set to 0. At step 105, the device sets m2, the second mask, to equal the bitwise inverse of m1 (the first mask).

At step 110, the loop counter register j is initialized to zero. At step 115, byte j of the modular multiplier register Q is loaded with (m1 ANDed with byte j of the base x) bitwise XORed with (m2 ANDed with byte j of R). Because m1 is either 255 or zero, and because m2 is the bitwise inverse of m1, byte j of Q's final value matches either x[j] or R[j]. In particular, if m1 equals 255 then Q is loaded with x, and otherwise with R. (Note that this step could be implemented identically using byte-wise addition ("+") or bitwise OR instead of the XOR. Here, "AND, "XOR", and "OR" denote standard bitwise AND, XOR, and OR operations, respectively.)

At step 117, j is incremented. At step 120, the device checks whether j equals k. If not, the processing branches back to step 115 to continue the loading of Q. If j does equal k, then processing continues to step 125, where the device updates R by computing R=RQ mod n. For improved performance, this modular multiplication step may be performed using a math coprocessor or other accelerated multiplier. The actual implementation of the multiplier does not affect this method. For example, Montgomery multiplication may be used (in which case the form of R and Q would be as appropriate for the Montgomery implementation, and appropriate preprocessing and post-processing would be applied to x and to R, respectively). Note that this method is designed to address security characteristics of the modular exponentiation method; if necessary, implementers should address leakage from the modular multiplier separately.

At step 130 the device loads an exponent bit's negated value into v by loading byte i of the exponent y, ANDing the byte with b, then XORing with b. In this step, i is used as an index to the appropriate exponent byte, and the (single) bit selected by b is selected with the AND operation. The final XOR with b inverts the bit. The possible values in v resulting from step 130 are 0 and b, where b is one of 1, 2, 4, 8, 16, 32, 64, and 128.

At step 135, three bit rotation operations are used to convert v into either 0 or 255. Specifically, v is set to 255 if the result of step 130 is a nonzero value in b, otherwise v is set to zero. The notation "ROR(v,w)" indicates rotating an 8-bit byte v to the right by w bits. For example, ROR(173,5) would indicate rotating the value 173 decimal ("10101101" binary) five bits to the right, yielding "01101101" binary, or 109 decimal. Most microprocessors and microcontrollers have rotate instructions. (For example, the Intel 80486 has instructions "ROR" and "ROL" for rotating registers to the right and left.) The three rotations (which may be performed in any order) are: set v to ROR(v,1); set v to ROR(v,2); and set v to ROR(v,4).

At step 140, the loop and byte counters are updated. The mask register m1 is loaded with 255 (if its current value is 255), otherwise with v (which itself equals either 255 or zero) by storing the value of (m1 OR v) into m1. Next, the register v is used to hold the result of m1 AND b temporarily. Finally, the value of (v AND 1) is subtracted from i, which has the effect of decrementing i if the least significant bit of v is set.

At step 145, the device determines whether the exponentiation has completed. If i is less than zero, processing continues to step 160, where the final value R is returned. Otherwise, processing continues to step 150, where b is updated if necessary. (The exponent bit position is updated whenever the processing moves to a new exponent bit, e.g., after a multiply or after a squaring with no subsequent multiply.) The binary operation "b=b XOR (m1 AND (b XOR ROR(b,1)))" at step 150 either leaves b unchanged (if m1 is zero), or rotates b right one bit position (if m1 is 255), and requires no key-dependent conditional branches. Finally, m1 is inverted and processing continues back to step 105 to continue the modular exponentiation.

The techniques of FIG. 1 greatly reduce the amount of information leaked from a cryptosystems to an attacker who is monitoring a device's power consumption, while running at virtually the same speed as previously known modular exponentiation techniques, since no extra modular multiplication steps are required. Further, processing path and memory accesses are not correlated to the key's value (except for the key's Hamming weight, which need not be kept secret).

Variations

Many variations of the basic techniques described above are possible. For example, the exemplary process described above with respect to FIG. 1 loads both (x and R) memory buffers (i.e., an exemplary type of fixed memory access pattern) with every loop iteration, which is advantageous for security reasons because it makes it difficult for attackers who are monitoring activity on I/O or bus lines to determine whether the operation is a squaring or a multiplication. However, for very high performance applications that must minimize processing overhead, it is possible instead to create a pointer to the desired number (e.g., x or R, which may be quite large) and then load from the pointer. For example, if p_x is a 16-bit pointer to x and p_R is a 16-bit pointer to R, and p_N is a 16-bit temporary pointer, p_x[HI] denotes the high 8 bits of p_x and p_x[LO] denotes the low 8 bits of p_x, then steps 110 through 120 could be implemented with: "p_N[HI] =(m1 AND p_x[HI]) XOR (m2 AND p_R[HI])," then "p_N[LO]=(m1 AND p_x[LO]) XOR (m2 AND p_R[LO])," followed by a loop to load the k bytes of data at p_N into Q.

Another variation involves using alternate encoding conventions. As shown above, the method of FIG. 1 uses standard exponent encoding conventions in which a "0" bit indirectly specifies a squaring (multiplication by self) operation and a "1" bit indirectly specifies a squaring (multiplication by self) followed by a multiplication (by other than self) operation. As described previously, these operations are conventionally executed by a bit value-dependent conditional jump (or branch) in the modular exponentiation algorithm. If standard encoding is not required, the method may be implemented using alternate forms of encoding in which the operations are directly specified. For example, for the exponent with standard binary representation "10010100010111100010," an exemplary operation-based encoding of the present invention could replace every "1" bit with "01," yielding the encoding "0100010010000100101010100010," which may be shortened to "100010010000100101010100010". In this case, each element in the sequence would directly specify the needed operation, i.e., a "0" bit for squaring (multiplication by self) and a "1" bit for multiplication (by other than self). As a consequence of such operation-based encoding, the execution path of the operation (and hence, the lower level instructions executed by the processor in carrying out the operation) remains fixed, rather than varying with the particular values of the exponent bit. That is, the form of the operation is always the same: replacing the value in R by the product of R multiplied by some operand. Only the operand's value changes from operation to operation, to be specified by the operational encoding bit or symbol as shown above. Thus, such operation-based encoding allows the processor operations to avoid the easy-to-detect, exponent-bit-value-dependent branch. Operation-based encoding, although requiring additional memory for key storage, may also be used to make variants of the method of FIG. 1 that are slightly simpler (and hence more compact).

Yet another variation involves modifying the method of FIG. 1 to add bit windowing techniques (such as k-ary modular exponentiation) that reduce the number of modular multiplication operations required. For example, when using 2-bit windowing (or pairwise modular exponentiation), one could modify the exemplary embodiment in FIG. 1 by adding additional masks m2, m3, etc., as appropriate. k-ary modular exponentiation techniques are well known (see, e.g., the *Handbook of Applied Cryptography* by Menezes et al., CRC Press, 1997, pages 614–634) and need not be described in greater detail here.

It will also be understood by one skilled in the art that various combinations of the variations discussed here can be used in connection with the invention. For example and without limitation, the operation-based encoding schemes may be combined with the bit windowing techniques using k-ary modular exponentiation where each nonzero exponent digit could represent a power of x, while zero digits could represent squaring operations. For example, as stated above, a "1" digit denotes simple multiplication of the result accumulator by the value x (i.e., by exponentiation of x to the power 1). Similarly, a "2" digit (if used) denotes multiplication $x^2$ mod n, and so forth. In one embodiment of the invention, a table of pointers may be employed to indicate the value of the bit. For example, the first entry (offset zero) could be a pointer to the result accumulator R (for squaring operations), the entry at offset 1 could point to x (i.e., $x^1$), the entry at offset 2 (if used) could point to the precomputed value $x^2$ mod n, and the entry at offset 3 (if used) could point to the precomputed value $x^3$ mod n. The powers of x may be precomputed at the beginning of the modular exponentiation operation; even so, the performance benefit obtained by reducing the number of multiplication operations during the modular exponentiation generally more than compensates for the precomputation time. Note that $x^0$ (equivalent to multiplication by 1) is not used; all steps involve multiplication with a number larger than 1 because "0" digits in the encoding represent multiplication by R.

For example, using a 2-bit (i.e., base 4) encoding, the exponent above (i.e., 10010100010111100010) in standard encoding would be "2110113202." Replacing each encoded bit with its equivalent operational encoding as described above, in which:

a) bit "0" is replaced by "00" to denote two squarings;
b) bit "1" is replaced by "001" to denote two squarings followed by multiplication by $x^1$;
c) bit "2" is replaced by "002" to denote two squarings followed by multiplication by $x^2$; and
d) bit "3" is replaced by "003" to denote two squarings followed by multiplication by $x^3$.

transforms the standard base 4 encoded exponent "2110113202" into the operation-encoded value "200100100001001003002000002," in which "0" represents squaring (i.e., multiplication by self), "1" represents multiplication by x, "2" represents multiplication by $x^2$, and "3" represents multiplication by $x^3$. In the foregoing example, those skilled in the art will readily understand that the transformation actually produces "00200100100001001003002000002," which for convenience has been shortened to "200100100001001003002000002" because the two leading zeroes represent squarings of the initial accumulator value R=1 (recall the first pseudocode above, as well as FIG. 1), which effectively accomplishes nothing. That is, the first substantive multiplication operation occurs upon reaching the first non-zero operationally encoded bit (e.g., "2"), when the accumulator is first loaded with some positive integer power of the base x specified by the value of that bit (e.g., $x^2$).

In yet another embodiment of the invention, an optimized encoding can reduce memory requirements of the modular exponentiator with little or no performance penalty by re-encoding equivalent representations. In the 2-bit operational encoding example, the operation specified by "02" (denoting R←$R^2$ followed by R←R $x^2$) is equivalent to the operation specified by "10" (denoting R←R x followed by R←$R^2$), because the overall operation in either case is R←($R^2$)($x^2$). Therefore, the exponent "200100100001001003002000002" can be re-encoded as "100010010000100100301000010"

Still other variations, including but not limited to reversing the order of the bytes in e, substituting functionally similar or equivalent operations, and reordering of processing steps will be understood by one of ordinary skill in the art in light of the basic embodiments disclosed herein, and need not be described in detail here.

The techniques described above with respect to leak-minimizing modular exponentiation can be generalized to the computation of other cryptographic operations. For example, in elliptic curve cryptosystems (including elliptic curve analogues of exponentiation-based cryptosystems), multiplication (on the curve) is implemented using addition operations (on the curve), just as exponentiation (mod n) is implemented using multiplication operations (mod n). Those skilled in the art will appreciate that, by substituting addition (on an elliptic curve) for multiplication mod n, the invention can be easily applied to minimize leakage from implementations of elliptic curve systems.

At the design/engineering stage, the techniques of the invention can be used to design and construct leak-minimizing modular exponentiators before expensive chip layout and construction costs are incurred. Alternatively, the techniques can be used to upgrade/replace existing modular exponentiators for improved security in leak-prone systems. Such upgrading/replacement could be performed manually, or implemented in automated code-updating processes that are well-known to those skilled in the art and need not be described in detail here.

Combination with Other Security Techniques

The techniques of the invention may be used as an alternative to (or supplement to) other well-known security techniques described in the Background of the Invention section, above. (For example, shielding against electromagnetic emanations from cryptographic devices.) Further security can be achieved by recognizing the statistical nature of the attack process. To obtain the key from a cryptosystems that leaks information gradually, an attacker usually gathers data by observing a series of operations, performing statistical operations on the observations (i.e., data sampling), and using the results to determine the key. Such observations contain signal (information that usefully corresponds to the key) and noise (information that hinders determination of the key). If the amount of noise is increased, or if the signal is decreased, the number of samples required for a successful attack will increase. Typically the number of observations required to identify a signal is roughly proportional (via a constant multiplicative factor) to the square of the value obtained by dividing the amplitude of the noise and error by the amplitude of the signal (i.e., inversely proportional to square of the signal-to-noise ratio). For example, increasing the noise by a factor of 2 and reducing the signal size to $2/3$ of its previous value would reduce the signal-to-noise ratio by a factor of 3 and thus increase the required number of samples by a factor of 9.

In some cases, such as many smartcards and other poorly-shielded cryptographic devices that rely on external power, attackers can determine the secret exponent from a single operation of a cryptosystems's exponentiators. In particular, for many such devices, the signal-to-noise ratios observed when monitoring with a sufficiently high sampling rate and accuracy, for example by using a digital storage oscilloscope, the key may be determined from one operation. Especially in such extreme cases, the present invention can be invaluable, enabling a system designer to reduce the signal size dramatically.

The invention enables a system designer to minimize the size of leaked signals correlated to secret keys, thereby increasing the amount of work required for an attacker to break the system. In some embodiments, the attacker's work factor can be made sufficiently large as to make attacks infeasible. For example, consider a system programmed to self-destruct after one million operations—well beyond the expected operational life of most smartcards. If a design not using the present invention requires five operations to break, and the present invention reduces the signal-to-noise ratio by a factor of 1000, the number of operations required to break the system (i.e., isolate the signal or key from the noise) would increase by a factor of one million. If the attack work factor exceeds the lifetime of the secret or the device, attackers would not be able to collect enough measurements to compromise the secret.

Applications and Fields of Use

Typically, the methods and apparatuses of the present invention might be embodied as program code running on a processor, for example, as instructions stored on in the memory of a smartcard. Where greater security is desired, the code might additionally be signed by a trusted party, for example, by the smartcard issuer. The invention might be embodied in a single-chip device containing both a nonvolatile memory for key storage and logic instructions, and a processor for executing such instructions.

More generally, the techniques of the invention may be embodied as code stored in a computer-readable memory of virtually any kind including, without limitation, RAM, ROM, magnetic media, optical media, or magneto-optical media. Even more generally, the invention could be implemented in software, or in hardware, or any combination thereof including, but not limited to, software running on a general purpose processor, microcode, PLAs, ASICs, and any application where there is a need for leak-minimized cryptography that prevents external monitoring attacks.

As those skilled in the art will appreciate, the techniques described above are not limited to particular host environments or form factors. Rather, they may be used in a wide variety of applications, including without limitation: cryptographic smartcards of all kinds including without limitation smartcards substantially compliant with ISO 7816-1, ISO 7816-2, and ISO 7816-3 ("ISO 7816-compliant smartcards"); contactless and proximity-based smartcards and cryptographic tokens; stored value cards and systems; cryptographically secured credit and debit cards; customer loyalty cards and systems; stored value cards and systems; cryptographically authenticated credit cards; customer loyalty cards and systems; cryptographic accelerators; gambling and wagering systems; secure cryptographic chips; tamper-resistant microprocessors; software programs (including without limitation programs for use on personal computers, servers, etc. and programs that can be loaded onto or embedded within cryptographic devices); key management devices; banking key management systems; secure web servers; electronic payment systems; micropayment systems and meters; prepaid telephone cards; cryptographic identification cards and other identity verification systems; systems for electronic funds transfer; automatic teller machines; point of sale terminals; certificate issuance systems; electronic badges; door entry systems; physical locks of all kinds using cryptographic keys; systems for decrypting television signals (including without limitation, broadcast television, satellite television, and cable television); systems for decrypting enciphered music and other audio content (including music distributed over computer networks); systems for protecting video signals of all kinds; intellectual property protection and copy protection systems (such as those used to prevent unauthorized copying or use of movies, audio content, computer programs, video games, images, text, databases, etc.); cellular telephone scrambling and authentication systems (including telephone authentication smartcards); secure telephones (including key storage devices for such telephones); cryptographic PCMCIA cards; portable cryptographic tokens; and cryptographic data auditing systems.

All of the foregoing illustrates exemplary embodiments and applications of the invention, from which related variations, enhancements and modifications will be apparent without departing from the spirit and scope of the invention. Therefore, the invention should not be limited to the foregoing disclosure, but rather defined by the claims appended hereto.

What is claimed is:

1. A method of cryptographically processing a message using an asymmetric cryptographic protocol involving a private key including a secret exponent, in a manner resistant to external detection of the secret exponent, comprising the steps of:
   (a) obtaining a digital quantity representative of at least a portion of said message, said digital quantity to be cryptographically processed using an asymmetric cryptographic protocol involving a private key including a secret exponent and an associated modulus;
   (b) transforming said exponent to an expanded representation thereof, said expanded representation including a sequence of symbols, each said symbol representing a modular multiplication;
   (c) loading an accumulator with a positive integer power of said digital quantity;
   (d) for each said symbol in at least a portion of said expanded representation:
      (i) multiplying, modulo said modulus, said value in said accumulator by a positive integer power of said digital quantity, said integer power being indicated by said symbol, and
      (ii) updating said accumulator with the result of said step (i),
      (iii) by executing a plurality of microprocessor instructions whose form is independent of the value of said symbol;
   thereby cryptographically processing said digital quantity in a manner resistant to external detection of said secret exponent.

2. The method of claim 1 where:
   (2a) said expanded representation includes symbols of at least first and second types;
   (2b) said step (c) occurs upon traversing said expanded representation and reaching a first symbol of said second type therein;
   (2c) step (d)(i) is thereafter performed as follows:
      (i) if said symbol is of said first type, said step of multiplying said value in said accumulator by said positive integer power of said digital quantity includes multiplying said accumulator value by itself, where said accumulator contains a positive integer power of said digital quantity, and
      (ii) if said symbol is of said second type, said step of multiplying said value in said accumulator by said positive integer power of said digital quantity includes multiplying said accumulator value by a previously stored positive integer power of said digital quantity.

3. The method of claim 2 where:
   (3a) said symbol of said first type includes zero bits; and
   (3b) said symbol of said second type includes non-zero bits.

4. The method of claim 1 executed using memory access patterns fixed such that said memory access pattern is independent of the value of said secret exponent.

5. The method of claim 1 characterized by an absence of multiplication-by-one operations.

6. The method of claim 1 performed in a smartcard.

7. The method of claim 1 where said step of multiplication modulo said modulus is performed using Montgomery multiplication.

8. The method of claim 1 where said asymmetric cryptographic protocol is RSA.

9. The method of claim 1 where said asymmetric cryptographic protocol is DSA.

10. The method of claim 1 where said asymmetric cryptographic protocol is Diffie-Hellman.

11. The method of claim 1 implemented as hardwired instructions on said processor.

12. The method of claim 1 implemented as software code for said processor.

13. A method of computing a modular exponentiation involving a digital message, as part of a private key operation in an asymetric cryptosystems involving a sequence of processor instructions, comprising the steps of:
   (a) obtaining a base representative of at least a portion of said message, said base to be cryptographically processed using an asymmetric cryptographic protocol involving a private key including a secret exponent and an associated modulus;
   (b) storing in a memory one or more values representing predefined positive integer powers of said base;
   (c) storing in an accumulator a value representing said base raised to an integer power;
   (d) using a portion of said secret exponent, deriving an index referencing one of said previously stored values, by executing a sequence of processor instructions having a form independent of said exponent;
   (e) multiplying, modulo said modulus, (i) a value in said accumulator and (ii) said referenced value, by executing a sequence of processor instructions having a form independent of a value of said index;
   (f) storing the result of said step (e) in said accumulator;
   (g) repeating said steps (d) through (g) until said accumulator contains a representation of said base raised to said exponent;
   thereby cryptographically processing said base in a manner resistant to detection of said exponent by monitoring of said processor instructions.

14. The method of claim 13 where:
   (14a) said indices are of at least first and second types;
   (14b) said step (c) occurs upon traversing said expanded representation and reaching a first index of said second type therein;
   (14c) step (e) is thereafter performed as follows:
      (e1) if said index is of said first type, said step of multiplying said value in said accumulator by said referenced value includes multiplying said accumulator value by itself, where said accumulator contains a positive integer power of said base, and
      (e2) if said index is of said second type, said step of multiplying said value in said accumulator by said referenced value includes multiplying said accumulator value by one of said stored predefined positive integer powers of said base.

15. The method of claim 14 where:
(15a) said index of said first type includes zero bits; and
(15b) said index of said second type includes non-zero bits.

16. The method of claim 13 executed using memory access patterns fixed such that said memory access pattern is independent of the value of said secret exponent.

17. The method of claim 13 characterized by an absence of multiplication-by-one operations.

18. A method of computing a modular exponentiation involving a digital message, as part of a private key operation in an asymmetric cryptosystems involving a sequence of processor instructions, comprising the steps of:
(a) obtaining a base representative of at least a portion of said message, said base to be cryptographically processed using an asymmetric cryptographic protocol involving a private key including a secret exponent and an associated modulus;
(b) storing in a memory one or more values representing predefined positive integer powers of said base;
(c) storing in an accumulator a representation of said base raised to an integer power;
(d) using a portion of said secret exponent, deriving an index specifying a multiplicand, where said multiplicand is a positive value of said base raised to an integer power, by executing a sequence of processor instructions having a form independent of said exponent;
(e) multiplying, modulo said modulus, (i) a value in said accumulator and (ii) said specified multiplicand, by executing a sequence of processor instructions having a form independent of a value of said index;
(f) storing the result of said step (e) in said accumulator;
(g) repeating said steps (d) through (g) until said accumulator contains a representation of said base raised to said exponent;
thereby cryptographically processing said base in a manner resistant to detection of said exponent by monitoring of said processor instructions.

19. The method of claim 18 where:
(19a) if said index is of a first type, said multiplicand in said steps (d) and (e) is obtained from said accumulator, and said multiplying in said step (e) is a squaring; and
(19b) if said index is of a second type, said multiplicand in said steps (d) and (e) is retrieved from said values stored in memory, and said multiplying in said step (e) is a multiplication of said accumulator value with said retrieved multiplicand.

20. The method of claim 18 where:
(20a) said deriving step (d) includes operation-based encoding; and
(20b) said processor instruction sequence in said step (e) is characterized by a fixed execution path.

21. The method of claim 18 where said step (e) includes:
(e1) reading a plurality of previously stored values from said memory, and
(e2) using said index, producing from said plurality of values the value referenced by said index.

22. The method of claim 18 executed such that the sequence of memory accesses performed by said processor is independent of the value of said exponent.

23. A method of securing a computer processor against external monitoring of cryptographic operations performed on a digital message thereby, comprising:
(a) obtaining a cryptographic key including at least a secret portion, where said key indirectly represents a sequence of operations for performing an asymmetric private key cryptographic operation on at least a portion of said message;
(b) transforming said secret portion of said private key to produce a fixed path representation of said asymmetric cryptographic operation, by defining a sequence of logic instructions and parameter accesses such that said sequence of logic instructions and parameter accesses is independent of the value of said secret portion;
(c) performing said private key operation by executing said sequence of logic instructions and parameter accesses in a manner that, when monitored, reveals no useful information about said secret portion, thereby securing said computer processor against external monitoring of cryptographic operations performed thereby.

24. The method of claim 23 where said sequence of operations includes modular exponentiation logic.

25. The method of claim 24 where said step (c) includes performing said sequence of parameter accesses using memory access patterns independent of the value of said secret portion.

26. The method of claim 23 where:
(i) said secret portion includes at least a portion of a secret exponent for use as a private key in an asymmetric cryptographic protocol; and
(ii) said step (c) includes operationally encoding of said exponent to replace a plurality of said path-dependent logic instructions, which are dependent on said secret exponent portion, with instructions having a form that is independent of said operationally encoded exponent.

27. The method of claim 23 configured for use in an elliptic curve cryptosystems.

28. The method of claim 27 where said step (c) includes a sequence of addition operations on an elliptic curve.

29. A computer-readable medium containing program logic code that, when executed, cryptographically processes a message using an asymmetric cryptographic protocol involving a private key including a secret exponent, in a manner resistant to external detection of the secret exponent, comprising:
(a) program logic code that, when executed, obtains a digital quantity representative of at least a portion of said message, said digital quantity to be cryptographically processed using an asymmetric cryptographic protocol involving a private key including a modulus and a secret exponent;
(b) program logic code that, when executed, transforms said exponent to an expanded representation thereof, said expanded representation including a sequence of symbols, each said symbol representing a modular multiplication;
(c) program logic code that, when executed, loads an accumulator with a positive integer power of said digital quantity;
(d) program logic code that, when executed, for each said symbol in at least a portion of said expanded representation:
(i) multiplies said value in said accumulator by a positive integer power of said digital quantity, said integer power being indicated by said symbol, and
(ii) updates said accumulator with the result of said step (i),
(iii) where the sequence of microprocessor instructions performed by said logic code is independent of the value of said symbol;

for cryptographically processing said digital quantity in a manner resistant to external detection of said secret exponent.

30. A computer-readable medium containing program logic code that, when executed, cryptographically processes a message using an asymmetric cryptographic protocol involving a private key including a secret exponent, in a manner resistant to external detection of the secret exponent, comprising:

(a) program logic code that, when executed, obtains a base representative of at least a portion of said message, said base to be cryptographically processed using an asymmetric cryptographic protocol involving a private key including a secret exponent and an associated modulus;

(b) program logic code that, when executed, stores in a memory one or more values representing predefined positive integer powers of said base;

(c) program logic code that, when executed, stores in an accumulator a value representing said base raised to an integer power;

(d) program logic code that, when executed, uses a portion of said secret exponent, deriving an index referencing one of said previously stored values, by executing a sequence of processor instructions having a form independent of said exponent;

(e) program logic code that, when executed, multiplies, modulo said modulus, (i) a value in said accumulator and (ii) said referenced value, by executing a sequence of processor instructions having a form independent of a value of said index;

(f) program logic code that, when executed, stores the result of said step (e) in said accumulator;

(g) program logic code that, when executed, repeats said steps (d) through (g) until said accumulator contains a representation of said base raised to said exponent;

for cryptographically producing said base in a manner resistant to detection of said exponent by monitoring of said processor instructions.

31. A computer apparatus containing logic instructions that, when performed, cryptographically process a message using an asymmetric cryptographic protocol involving a private key including a secret exponent, in a manner resistant to external detection of the secret exponent, comprising:

(a) instructions for obtaining a digital quantity representative of at least a portion of said message, said digital quantity to be cryptographically processed using an asymmetric cryptographic protocol involving a private key including a modulus and a secret exponent;

(b) instructions for transforming said exponent to an expanded representation thereof, said expanded representation including a sequence of symbols, each said symbol representing a modular multiplication;

(c) instructions for loading an accumulator with a positive integer power of said digital quantity;

(d) instructions for operating on each said symbol in at least a portion of said expanded representation as follows:
  (i) multiplying said value in said accumulator by a positive integer power of said digital quantity, said integer power being indicated by said symbol, and
  (ii) updating said accumulator with the result of said step (i),
  (iii) said instructions having a form independent of the value of said symbol;

for cryptographically processing said digital quantity in a manner resistant to external detection of said secret exponent.

32. The computer apparatus of claim 31 where:
(32a) said expanded representation includes symbols of at least first and second types;
(32b) said instructions (c) are configured to be performed upon traversing said expanded representation and reaching a first symbol of said second type therein;
(32c) in said instructions (d)(i):
  (iii) if said symbol is of said first type, said multiplying said value in said accumulator by said positive integer power of said digital quantity includes multiplying said accumulator value by itself, where said accumulator contains a positive integer power of said digital quantity, and
  (iv) if said symbol is of said second type, said multiplying said value in said accumulator by said positive integer power of said digital quantity includes multiplying said accumulator value by a previously stored positive integer power of said digital quantity.

33. The computer apparatus of claim 32 where:
(33a) said symbol of said first type includes zero bits; and
(33b) said symbol of said second type includes non-zero bits.

34. The computer apparatus of claim 31 characterized by memory access patterns fixed such that said memory access pattern is independent of the value of said secret exponent.

35. The computer apparatus of claim 31 characterized by an absence of multiplication-by-one operations.

36. A computer apparatus containing logic instructions that, when performed, cryptographically process a message using an asymmetric cryptographic protocol involving a private key including a secret exponent, in a manner resistant to external detection of the secret exponent, comprising:

(a) instructions for obtaining a base representative of at least a portion of said message, said base to be cryptographically processed using an asymmetric cryptographic protocol involving a private key including a secret exponent and an associated modulus;

(b) instructions for storing in a memory one or more values representing predefined positive integer powers of said base;

(c) instructions for storing in an accumulator a representation of said base raised to an integer power;

(d) instructions for using a portion of said secret exponent to derive an index referencing one of said previously stored values of said base raised to an integer power, by executing a sequence of processor instructions having a form independent of said exponent;

(e) instructions for multiplying modulo said modulus (i) a value in said accumulator and (ii) said referenced value, by executing a sequence of processor instructions having a form independent of a value of said index;

(f) instructions for storing the result of said step (e) in said accumulator;

(g) instructions for repeating said steps (d) through (g) until said accumulator contains a representation of said base raised to said exponent;

for cryptographically processing said base in a manner resistant to detection of said exponent by monitoring of said processor instructions.

37. The computer apparatus of claim 36 where:
(37a) said indices are of at least first and second types;
(37b) said instructions (c) are configured to be performed upon traversing said expanded representation and reaching a first index of said second type therein;

(37c) in said instructions (e):
- (e1) if said index is of said first type, said multiplying said value in said accumulator by said referenced value includes multiplying said accumulator value by itself, where said accumulator contains a positive integer power of said base, and
- (e2) if said index is of said second type, said multiplying said value in said accumulator by said referenced value includes multiplying said accumulator value by one of said stored predefined positive integer powers of said base.

38. The computer apparatus of claim 37 where:

(38a) said index of said first type includes zero bits; and (38b) said index of said second type includes non-zero bits.

39. The computer apparatus of claim 36 characterized by memory access patterns fixed such that said memory access pattern is independent of the value of said secret exponent.

40. The computer apparatus of claim 36 characterized by an absence of multiplication-by-one operations.

41. The computer apparatus of claim 36 where said instructions for multiplying modulo said modulus perform Montgomery multiplication.

42. A method of securing a computer processor against external monitoring of cryptographic operations performed thereby, comprising:
- (a) receiving logic instructions for execution on said processor to implement a cryptographic operation involving a cryptographic secret;
- (b) identifying an execution path-dependent portion of said logic instructions configured to produce a first computational result, and which would, if executed, reveal useful information about said cryptographic secret upon external monitoring; and
- (c) securing said processor against external monitoring, by replacing said path-dependent logic instructions with execution path-independent logic code that, when executed, reproduces said first computational result, and when monitored, reveals no useful information about said cryptographic secret.

43. The computer-readable medium of claim 29 or 30 configured for use with a smartcard.

44. The computer apparatus of claim 31 or 36 configured as a smartcard.

* * * * *

UNITED STATES PATENT AND TRADEMARK OFFICE
CERTIFICATE OF CORRECTION

PATENT NO. : 6,298,442 B1
DATED : October 2, 2001
INVENTOR(S) : Kocher et al.

It is certified that error appears in the above-identified patent and that said Letters Patent is hereby corrected as shown below:

Column 12,
Line 6, delete "claim 1" and insert -- claims 1, 13, 18, 23 or 42 -- therefor.
Line 23, delete "cryptosystems" and insert -- cryptosystem -- therefor.

Column 13,
Line 12, delete "cryptosystems" and insert -- cryptosystem -- therefor.

Column 14,
Line 34, delete "cryptosystems" and insert -- cryptosystem -- therefor.

Column 15,
Line 38, delete "producing" and insert -- processing -- therefor.

Signed and Sealed this

Thirtieth Day of April, 2002

JAMES E. ROGAN
*Director of the United States Patent and Trademark Office*

*Attest:*

*Attesting Officer*